United States Patent [19]

Koshi

[11] Patent Number: 4,798,463
[45] Date of Patent: Jan. 17, 1989

[54] SPECTROFLUOROPHOTOMETER

[75] Inventor: Hiroyuki Koshi, Katsuta, Japan

[73] Assignee: Hitachi, Ltd., Tokyo, Japan

[21] Appl. No.: 77,174

[22] Filed: Jul. 24, 1987

[30] Foreign Application Priority Data
Aug. 1, 1986 [JP] Japan ................... 61-179967

[51] Int. Cl.⁴ .................. G01J 3/44; G01N 21/64
[52] U.S. Cl. ..................... 356/318; 250/458.1; 356/243; 356/301
[58] Field of Search ............. 356/73, 301, 317, 318, 356/243; 250/458.1, 459.1, 461.1, 461.2

[56]  References Cited
FOREIGN PATENT DOCUMENTS
3623052 1/1987 Fed. Rep. of Germany ...... 356/301

OTHER PUBLICATIONS

Klyshko et al, *Sov. Phys. Dokl.* vol. 23, No. 1, Jan. 1978, pp. 55-57.
Bristow et al, *Applied Optics*, vol. 20, No. 17, Sep. 1, 1981, pp. 2889-2906.

*Primary Examiner*—F. L. Evans
*Attorney, Agent, or Firm*—Antonelli, Terry & Wands

[57] ABSTRACT

This invention is for obtaining ratios of Raman spectrum by using a referential sample representing at least two of Raman spectral lines, and for correcting fluorescence intensities of the sample to measured on the basis of the obtained ratios of Raman spectrum.

8 Claims, 3 Drawing Sheets

SPECTROFLUOROPHOTOMETER

BACKGROUND OF THE INVENTION

This invention relates to a spectrofluorophotometer adequate for measurement requiring a process of spectrum correction.

As a method for performing spectrum correction in the spectrofluorophotometer, a photoquantummetry or a method using a standard light source of which wavelength characteristics is known has been used according to an excitation side spectroscope, a fluorescence side spectroscope, and wavelength range, as published in W. H. Melhuish, Absolute Spectrofluorometry, NATIONAL BUREAU OF STANDARDS SPECIAL PUBLICATION 378 p.p.137-150 (in 1973).

Such a conventional art has the problem that a device exclusive for spectrum correction is required, and that an axis of light, introduction of light into the spectroscope and so forth are different between when the wavelength characteristics of the spectroscopes is measured and when that of a sample is measured. For example, in order to measure wavelength characteristics of the fluorescence sided spectroscope by a photoquantum meter, the photoquantum meter is required, and the excitation side spectroscope and the fluorescence side spectroscope are required to be scanned simultaneously at the same wavelength. In this case, the problem is that a slight difference of wavelengths between those spectroscopes and a spectrum of the light source are included in the measured wavelength characteristics, which causes distorsion of the spectrum of the sample to be measured. And, the method by a referential light source has the problems that the referential light source is required, and that introduction of light into the spectroscopes is different from that in measuring the sample because the referential light source can not be set at the location on which the sample is positioned.

SUMMARY OF THE INVENTION

The object of the invention lies in performing spectrum correction without using a special device, and in measuring the wavelength characteristics of the spectrofluorophotometer under the quite same condition as the case in which a sample is measured.

Therefore, this invention is designed to utilize the Raman spectrum which has been regarded as a noise in the conventional fluoroanalysis. That is, this invention is designed to obtain ratios of the Raman spectral lines by using a standard sample which represents at least two Raman spectral lines, and to correct fluorescence intensity of the sample to be measured on the basis of the obtained ratios of the Raman spectral lines.

The Raman spectrum has no relation to its excitation wavelength, and appears at a wavelength which is a given wave number distant from the excitation wavelength. If the Raman spectral lines are more than two, intensity ratio of the Raman spectral lines are obtained regardless of the excitation wavelength and are originally constant. Therefore, due to wavelength characteristics of the device, variation in the excitation wavelength causes variation in this ratio of the Raman spectrum itself. Therefore, this invention is designed to obtain ratios of Raman spectral lines by using a referential sample before measurement, and to obtain a wavelength characteristics of the device from the ratios, and to correct fluorescence intensities of the sample to be measured.

In determination of the ratio of Raman spectrum, it is to be noted that a spectrum in a long wavelength range more enlarges than that in a short wavelength range, because a shape of spectrum of Raman scattering is constant by a unit of wave number. Therefore, in order to obtain the ratio of the spectrum, it is preferable to use area-integrated values calculated by a unit of wave number.

The standard sample represents at least two Raman spectral lines, and is usually different sample from the sample to be measured. However, the standard sample can be used as a sample to be measured if its fluorescence spectrum and Raman spectrum are distinguished as independent of each other.

DESCRIPTION OF THE PREFERRED EMBODIMENT

An embodiment of this invention is described as follows with reference to the drawings.

Figure 1:
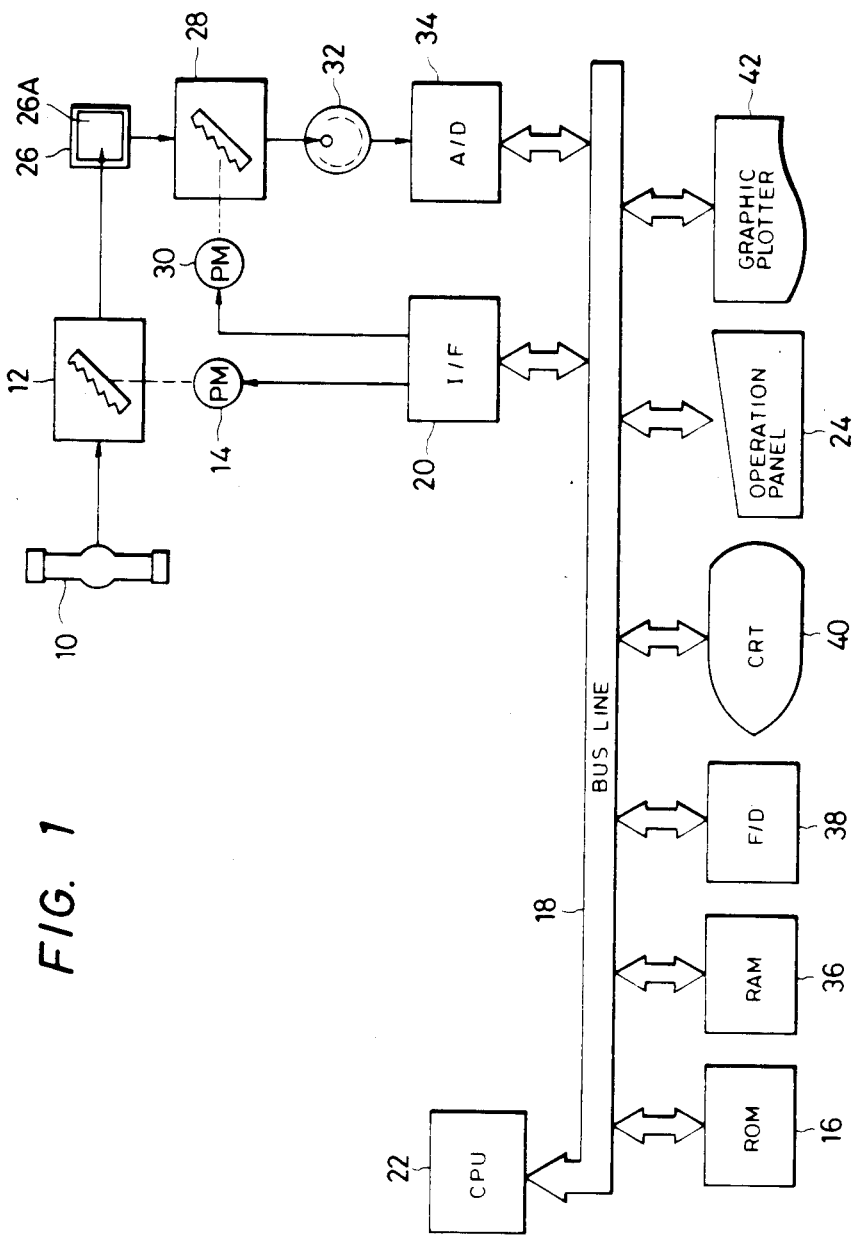
FIG. 1 is a constructional drawing showing an embodiment of a spectrofluophotometer according to the invention.
Figure 2:
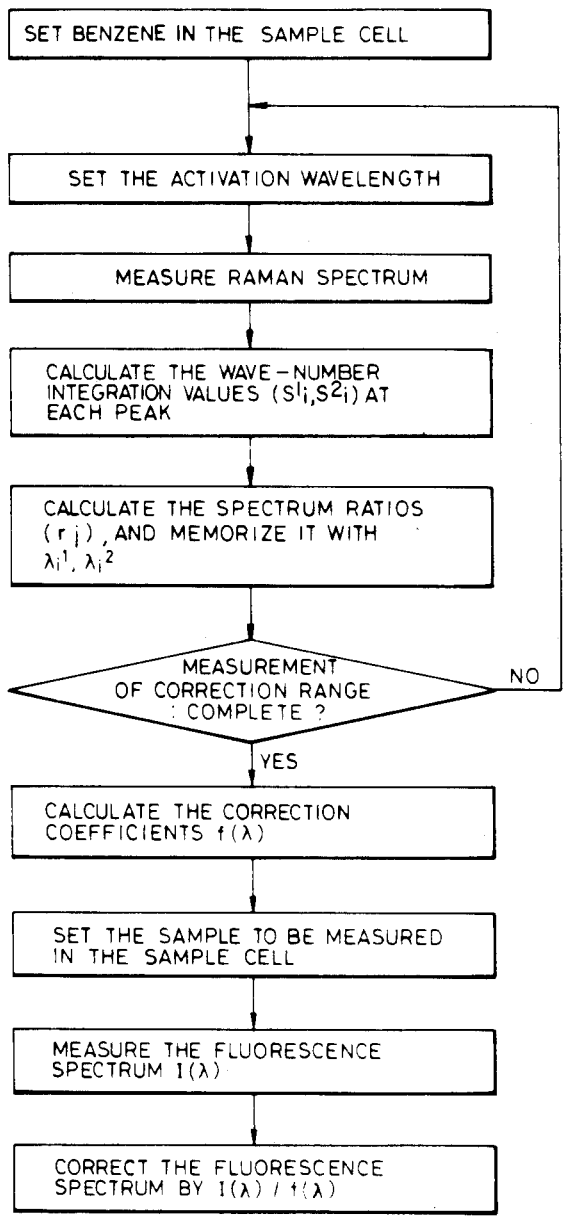
FIG. 2 is a flow chart showing an operational procedure to obtain correction coefficients.

As shown in FIG. 1, light ray radiated from a light source 10 is incident on an excitation side spectroscope 12. A setting wavelength of the excitation side spectroscope can be varied by a pulse motor 14. Motion of the pulse motor 14 is programmed in a ROM 16, and is instructed through a bus line 18 and an interface 20 by a CPU 22. Wavelength of the excitation side spectroscope 12 is set by keying-in of a predetermined excitation wavelength by an operational panel 24. A single colour light taken out by the excitation side spectroscope 12 irradiates a sample to be measured 26A in a sample cell 26. Fluorescence radiated from the sample 26A is incident on the fluorescence side spectroscope 28. The fluorescence side spectroscope 28 is driven by a pulse motor 30. Motion of the pulse motor 30 is programmed in the ROM 16, and is instructed through the bus line 18 and the interface 20 by the CPU 22. If a predetermined wavelength range is keyed in by the operational panel and operation of wavelength is started, beams of single colour light in the wavelength range are incident on a detector 32 one after another, so as to be transformed into electrical signals. The electrical signals are transformed into digital signals by an analogue-digital converter 34, so that the fluorescence intensity at each wavelength is stored in a RAM 36. Wavelength characteristics are obtained on the basis of the fluorescence intensities of the Raman spectrum by a calculation program stored on a floppy disk 38. For a fluorescence intensity of the Raman spectrum corresponding to each excitation wavelength in the predetermined wavelength range, a correction coefficient is calculated. The correction coefficient is for correcting the wavelength characteristics of the device stored in the RAM 36. The fluorescence spectrum is displayed on a CRT 40 on which a horizontal axis represents wavelength and a vertical line represents fluorescence intensity. Furthermore, the fluorescence spectrum displayed on the CRT 40 is recorded by starting motion of a graphic plotter 42 by the operational panel 24.

Next, referring to FIG. 2 to FIG. 5, described is a procedure for obtaining the correction coefficients for correcting the wavelength characteristics of the device.

The standard sample is set in a sample cell, the standard sample being for obtaining the correction coefficient. The standard sample is preferably benzene which is a very general sample, and which shows comparatively intensive Raman scattering. Benzene contains many Raman spectral lines, but shows two of them, of approximately 990 cm$^{-1}$ and 3060 cm$^{-1}$, if measured at the slit width of 5 nm.

Figure 3:
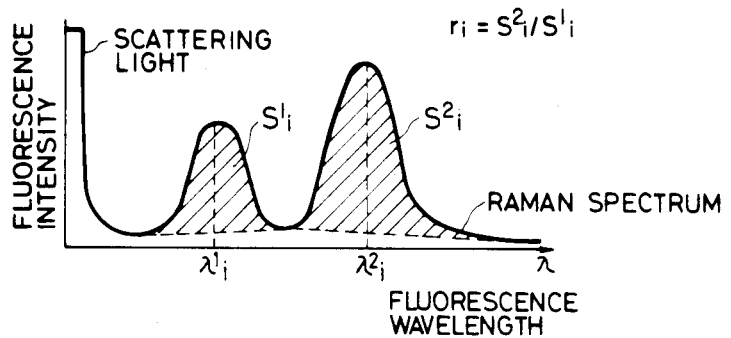
FIG. 3 to FIG. 5 are explanational graphs showing the points for calculating the correction coefficients.

Next, a correction range is determined, and the excitation wavelength of the excitation side spectroscope is set one after another. And, Raman spectral lines corresponding to the excitation wavelengths $\lambda_i$ are measured as shown in FIG. 3. The Raman spectral lines are wave-number integrated, so as to obtain each intensity of Raman scattering, while a background is subtracted from and is not included in the integration values $S_1{}^1$, $S_{2i}$. A spectrum ratio $r_1$ is obtained on the basis of the integration values $S_1{}^1$, $S_i{}^2$, is memoried with wavelengths $\lambda^1{}_i$, $\lambda^2{}_i$ of the Raman spectrum corresponding to the excitation wavelength $\lambda_o$. The above-mentioned operation is repeated within the predetermined correction range, and measurement for the standard sample is complete.

Figure 4:
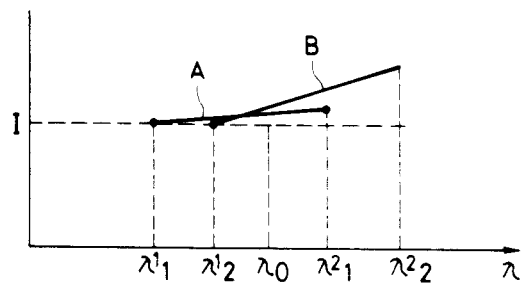
Figure 5:
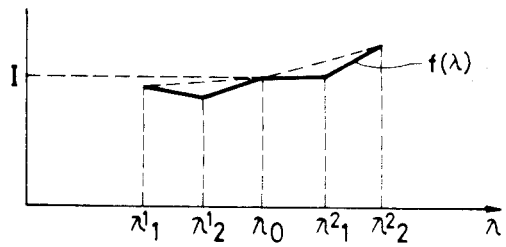

FIG. 4 shows a relation between the wavelengths of the Raman spectrum $\lambda^1{}_i$, $\lambda^2{}_i$ and the spectrum ratios $r_i$. All of the spectrums are on a function of the first degree because they are obtained for each excitation wavelength. The correction coefficient shown in FIG. 5 can be obtained by setting an arbitrary wavelength $\lambda_o$ so as to exist on both of correction straight lines A, B, and moving the straight lines A, B in parallel so that the wavelength $\lambda_o$ is 1, and connecting the starting points and the ending points of each straight line. The above-mentioned operation is repeated one after another, and a correction coefficients $f(\lambda)$ all over the set correction range is obtained.

Next, a fluorescence spectrum is measured by setting the sample to be measured in the sample cell, and a corrected or true spectrum is obtained by using the correction coefficients $f(\lambda)$.

The correction coefficients obtained in the above description come from the overlapped wavelength characteristics of the fluorescence side spectroscope and the deterter. In the same manner, the wavelength characteristics of the excitation side spectroscope is obtained by fixing the fluorescence wavelength and scanning the excitation side spectroscope. Accuracy of the correction can be improved by plotting more numbers of the spectrum ratios $r_i$.

The above-mentioned standard sample is benzene. However, other kinds of samples are applicable to the spectrum correction according to this invention, if they satisfy the following conditions.

(1) The sample has more than two Raman spectral lines.

The sample can be a mixed sample. And, "more than two lines" means the separation into two lines at the resolving power of the fluorophotometer (of approximately 5 nm).

(2) Intensity ratios of two Raman spectral lines are almost same.

This is very important for accuracy in the correction calculation. That is, S/N ratio is low because the Raman light is very weak similarly to the fluorescence. Therefore, intensity ratio is preferably approximately 2 to 3:1 at maximum, because a spectrum with a greatly different intensity ratio is subject to more influence of the noise. The intensity ratio of benzene is 1:1.7 at the slit width of 5 nm.

(3) Two Raman spectral lines are separate each other.

Raman scattering appears a given number of waves distant from the excitation wavelength. Therefore, the distance between spectral lines is different if Raman scattering is measured at the wavelength (axis) near 200 nm and 500 nm. Two spectral lines are required to be separate each other, in order to perform spectrum correction according to this invention. Therefore, a correctable wavelength range is determined by the distance between spectral lines (units of wave number).

The distance between spectral lines of benzene is 2070 cm$^{-1}$. This corresponds to 8.6 nm near 200 nm, and to 57 nm near 500 nm. As a result, if the slit width is set at 5 nm, two Raman spectral lines are not separated enough to be measured near 200 nm. A measurable wavelength range is more than 400 nm, if benzene is used at the slit width of 5 nm. In order to make the measurable wavelength range more than 200 nm, it is necessary to use the sample of which the distance between two spectral lines is more than 7500 cm$^{-1}$.

According to this invention, any special device for performing spectrum correction is not required, and the wavelength characteristics of the spectrofluorophotometer can be measured under the same condition as that in measurement using the sample to be measured.

I claim:

1. A spectrofluorophotometer comprising a light source, an excitation side spectroscope for separating a light ray from the light source, a sample cell having a sample to be irradiated with excitation light from the excitation side spectroscope, a fluorescence side spectroscope for separating a fluoroescence generated from the sample by irradiating with the excitation light, detecting means for detecting the intensity of the fluorescence from the fluorescence side spectroscope, and calculation means for processing signals from the detecting means, wherein when a standard sample representing at least two Raman spectral lines is disposed in the sample cell, said detecting means detects the intensity for each Raman spectral line and provides output signals thereof, the calculation means including means for obtaining a ratio of the Raman spectrum in accordance with the at least two Raman spectral lines and for calculating a correction coefficient in accordance therewith, the calculating means further including means for correcting the intensity of the fluorescence detected by the detecting means when a sample to be measured is provided in the sample cell in accordance with the correction coefficient of the ratio of the Raman spectrum.

2. A spectrofluorophotometer according to claim 1, wherein the standard sample is benzene.

3. A spectrofluorophotometer according to claim 1, wherein the calculating means calculates ratios of area integrating values of the at least two Raman spectral lines of the Raman spectrum as the ratios of the Raman spectrum.

4. A spectrofluorophotometer according to claim 1, wherein the standard sample representing at least to Raman spectral lines provides an intensity therefor which is almost the same.

5. A spectrofluorophotometer according to claim 1, wherein the detecting means provides analogue output signals, and further comprising A/D converter means for converting the analogue output signals from the detecting means to digital signals, the calculation means including processing means for arithmetically processing the digital signals from the A/D converter means, and pulse motor means coupled to the calculation means for driving the excitation side spectroscope and the fluorescence side spectroscope.

6. A spectrofluorophotometer according to claim 5, wherein the standard sample is benzene.

7. A spectrofluorophotometer according to claim 5, wherein the calculating means calculates ratios of area integrating values of the at least two Raman spectral lines of the Raman spectrum as the ratios of the Raman spectrum.

8. A spectrofluorophotometer according to claim 5, wherein the standard sample representing at least two Raman spectral lines provides an intensity therefor which is almost the same.

* * * * *